(12) United States Patent
Dong

(10) Patent No.: US 7,784,831 B2
(45) Date of Patent: Aug. 31, 2010

(54) SEAT BELT LOAD LIMITING DEVICE

(75) Inventor: Ke Dong, Troy, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 260 days.

(21) Appl. No.: 12/147,537

(22) Filed: Jun. 27, 2008

(65) Prior Publication Data

US 2009/0322066 A1    Dec. 31, 2009

(51) Int. Cl.
*B60R 22/28* (2006.01)
(52) U.S. Cl. .................................. 280/805; 297/471
(58) Field of Classification Search ................ 280/805, 280/806; 297/470, 471, 479
See application file for complete search history.

(56) References Cited

U.S. PATENT DOCUMENTS

| | | | | |
|---|---|---|---|---|
| 3,026,972 A | | 3/1962 | Hendry | 188/1 |
| 3,649,786 A | * | 3/1972 | Mauron | 200/61.53 |
| 3,680,913 A | | 8/1972 | Seybold | 297/386 |
| 3,973,650 A | * | 8/1976 | Nagazumi | 188/371 |
| 4,258,934 A | * | 3/1981 | Tsuge et al. | 280/806 |
| 5,069,482 A | | 12/1991 | Fohl | 280/801 |
| 5,431,447 A | | 7/1995 | Bauer | 280/805 |
| 5,634,690 A | * | 6/1997 | Watanabe et al. | 297/480 |
| 5,664,807 A | | 9/1997 | Bohmier | 280/805 |
| 5,971,489 A | | 10/1999 | Smithson et al. | 297/472 |
| 6,135,564 A | | 10/2000 | Wier | 297/472 |
| 6,299,211 B1 | | 10/2001 | Wier | 280/806 |
| 6,712,394 B2 | | 3/2004 | Betz et al. | 280/805 |
| 7,137,648 B2 | | 11/2006 | Schulz et al. | 280/805 |
| 7,631,899 B2 | * | 12/2009 | Nakayama et al. | 280/805 |
| 2009/0326765 A1 | * | 12/2009 | Dong | 701/45 |

FOREIGN PATENT DOCUMENTS

| | | |
|---|---|---|
| SE | 9000168 | 7/1991 |
| WO | WO 02/087931 | 11/2002 |

* cited by examiner

*Primary Examiner*—Paul N Dickson
*Assistant Examiner*—Timothy D Wilhelm

(57) ABSTRACT

A load limiting device for mounting a seat belt buckle includes a plow shoe attached to one of the buckle and the vehicle and a pair of opposed plates attached to the other of the buckle and the vehicle. The plates have the plow shoe captured therebetween so that upon imposition of an occupant restraint load on the buckle, the plow shoe travels therebetween the plates and absorbs energy by deforming at least one of the plates. An adjuster mechanism adjusts the distance between the opposed plates to selectively increase or decrease the energy absorbing capacity of the load limiting device by determining the extent of metal deformation occurring upon the travel of the plow shoe.

20 Claims, 2 Drawing Sheets

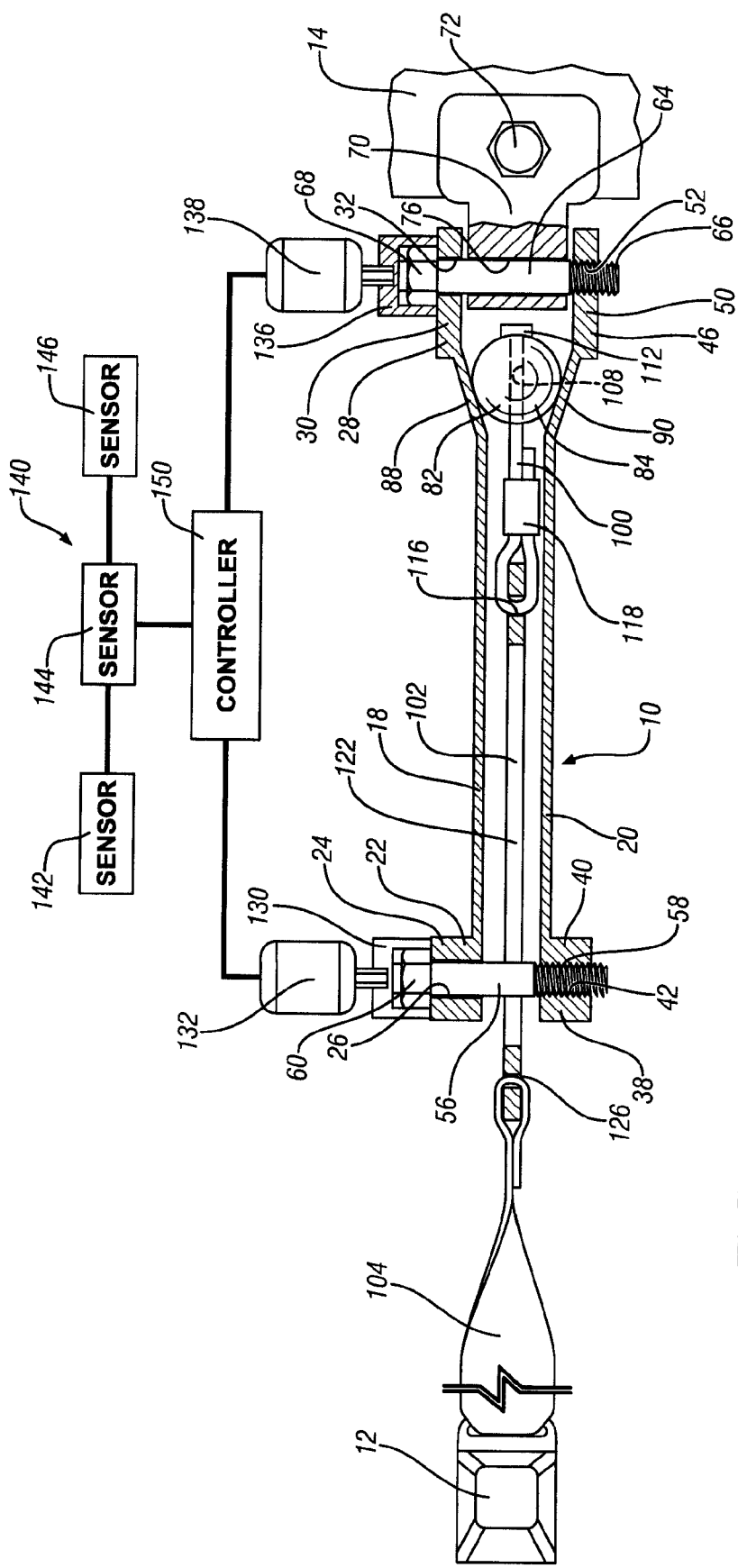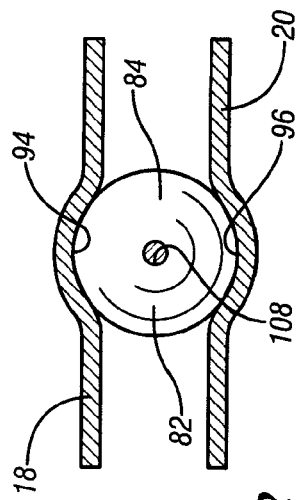

SEAT BELT LOAD LIMITING DEVICE

FIELD OF THE INVENTION

The present invention relates to a device for limiting the load imposed upon a seated occupant by a seat belt, and more particularly provides an energy-absorbing load limiter which is adjusted in response to sensed conditions to precisely limit the load.

BACKGROUND OF THE INVENTION

It is well known to motor vehicles to provide a seat belt system in which a lap belt and a shoulder belt wrap around the occupant and are connected to the vehicle body or the vehicle seat by a seat belt buckle. Upon loading of the occupant against the seat belt, the forward excursion of the occupant is limited by the restraint of the seat belt. It has been proposed in the prior art to limit the load experienced by the occupant by providing a load limiting device in the connection between the seat belt buckle and the vehicle. It would be desirable, however, to provide a load limiting device which would be adjustable to more precisely adjust the load limiting threshold to the needs of a particular occupant, depending on the variables such as vehicle speed and vehicle weight, occupant weight, etc.

SUMMARY OF THE INVENTION

According to the invention, a load limiter is provided for mounting a seat belt buckle on a vehicle and comprises a plow shoe attached to either the buckle or the vehicle, and a pair of opposed plates which are attached to the other of the buckle and the vehicle. The plates are spaced apart and have the plow shoe captured therebetween so that upon imposition of an occupant restraint load on the buckle, the plow shoe travels therebetween and absorbs energy by deforming at least one of the plates. An adjuster mechanism adjusts the distance between the opposed plates to selectively increase and decrease the energy absorbing capacity of the load limiting device by determining the extent of metal deformation that will occur upon the travel of the plow shoe. The adjuster mechanism is controlled by a plurality of sensors for sensing conditions, a controller, and an electric actuator that operates the adjuster mechanism.

Further areas of applicability of the invention will become apparent from the detailed description provided hereinafter. It should be understood that the detailed description and specific examples, while indicating exemplary embodiments of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIG. 1 is a side elevation view of the load limiting device having parts broken away and in section.

FIG. 2 is a section view taken in the direction of arrows 2-2 of FIG. 1.

DETAILED DESCRIPTION OF THE EXEMPLARY EMBODIMENTS

Figure 3:
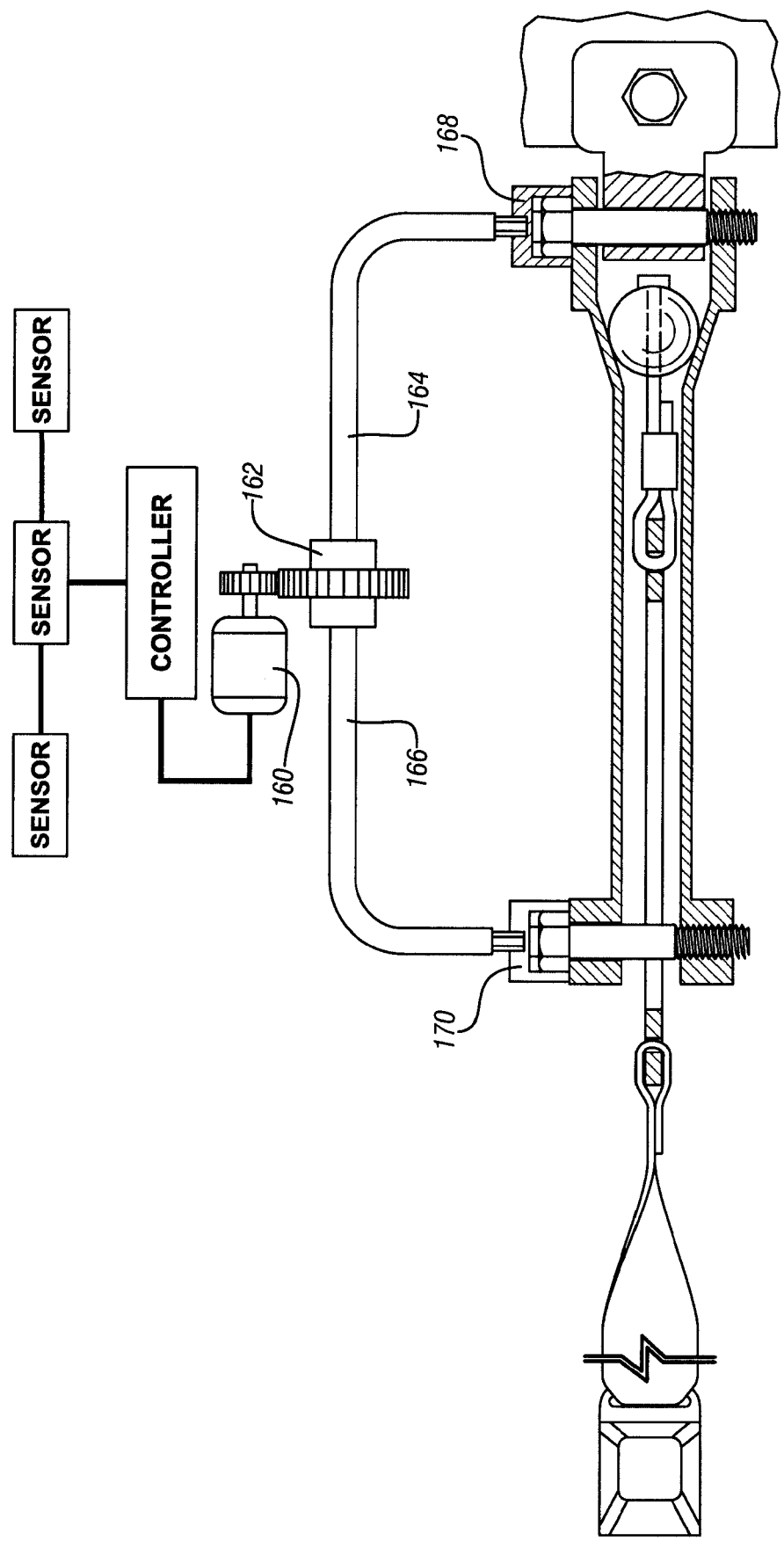
FIG. 3 is a view similar to FIG. 1 but showing a single motor for controlling the device.

The following description of certain exemplary embodiments is merely exemplary in nature and is not intended to limit the invention, its application, or uses.

Referring to FIG. 1, a load limiting device generally indicated at 10 is provided for mounting a seat belt buckle 12 on a vehicle body generally indicated at 14.

The load limiting device 10 includes an upper plate 18 and a lower plate 20 which are preferably of stamped sheet steel construction. The upper plate 18 is, in general, a strip of sheet steel having a width as shown in FIG. 2 and a length as shown in FIG. 1. A left-hand end 22 of the upper plate 18 includes a boss 24 having an aperture 26. Likewise, the right-hand end 28 of the upper plate 18 has a boss 30 with an aperture 32. Lower plate 20 is similar to the upper plate 18 and has at its left end 38 a boss 40 having a threaded aperture 42 therethrough. The right-hand end 46 of the lower plate 20 has a boss 50 including a threaded aperture 52 there through. The left-hand end 22 of the upper plate 18 and the left-hand end 38 of the lower plate 20 are connected together by a screw 56 having a threaded end 58 that is threadedly received in the threaded aperture 42 of the boss 40. Screw 56 has a hex head 60 that bears upon the boss 24 of the upper plate 18. Likewise, at the right-hand end of load limiting device 10, a screw 64 has a lower threaded end 66 that is threadedly engaged in the threaded aperture 52 of the boss 50. Screw 64 also has a hex head 68 that rests upon the boss 30 of the upper plate 18. The right-hand end of the load limiting 10 is connected to the vehicle body 14 by an anchor bracket 70 that is bolted to the body by a bolt 72. Anchor bracket 70 includes a bore 76 that receives the screw 64.

As seen in FIGS. 1 and 2, a plow shoe 82 in the form of a ball 84 is seated between the upper plate 18 and the lower plate 20. In FIG. 1, plow shoe 82 is captured between inclined wall portion 88 of the upper plate 18 and inclined wall portion 90 of the lower plate 20. In addition, as shown in FIG. 2, the ball 84 is captured and guided within a groove 94 provided in the upper plate 18 and a groove 96 provided in the lower plate 20.

The plow shoe 82 is connected to the buckle 12 by a cable 100, a slotted strap 102, and a seat belt 104. The cable 100 extends through a hole 108 provided in the plow shoe 82. An enlarged end fitting 112 is swaged onto the end of the cable 100. Cable 100 reaches through a slot 116 in the slotted strap 102 and is connected thereto by swaged connector 118, thereby connecting the plow shoe 82 with the slotted strap 102. As seen in FIG. 1, the slotted strap 102 has a longitudinal extending central slot 122 therein by which the slotted strap 102 straddles the screw 56. The seat belt 104 that is connected to the buckle 12 has an end which fits through a slot 126 of the slotted strap 102.

Referring again to FIG. 1, it is seen that a drive socket 130 is seated upon the head 60 of the screw 56 and is connected to an electric motor 132. Likewise, a drive socket 136 is seated on the hex head 68 of the screw 64 and is driven by an electric motor 138.

A control system or mechanism generally indicated at 140 is provided for operating the motors 132 and 138. The control mechanism 140 includes a plurality of sensors 142, 144 and 146 for sensing various conditions. These sensors can sense conditions such as vehicle speed, occupant weight, occupant position, seat position, or other operating variables. These sensors provide inputs to a controller 150 that will operate the motors 132 and 138 in response to the conditions sensed by the sensors 142, 144 and 146.

In operation, it will be understood that upon loading of the seat belt buckle 12 by an occupant restraint load, the buckle 12 acting through the cable 100, the slotted strap 102 and the belt 104 will urge the plow shoe 82 leftwardly relative to the upper plate 18 and the lower plate 20. At a load of a certain magnitude the plow shoe 82 will travel leftwardly along the groove 94 of the upper plate 18 and groove 96 of the lower plate 20, as permitted by the deformation of the metal of the upper plate 18 and the lower plate 20. Accordingly, by virtue of the leftward travel of the plow shoe 82, and the deformation of metal during the leftward travel, the maximum load imposed on the buckle 12 can be limited as determined by the extent of energy absorption occurring as a result of the deformation of the metal.

The magnitude of the energy absorption can be adjusted by rotating screws 56 and 64 to thereby adjust the distance between the upper plate 18 and the lower plate 20. In particular, for example, energizing the motor 132 will turn the socket 130, which in turn rotates the screw 56 to change the distance between the lower plate 20 and the upper plate 18. Likewise, energizing the motor 138 will change the distance between the plates 18 and 20 at the right-hand ends thereof. It will be understood and appreciated that the controller 150 will include algorithms that will determine the actuation of the motors 132 and 138. Controller 150 can control the motors in unison to keep the upper plate and the lower plate in parallel relation with one another as shown in FIG. 1. Alternatively, the controller 150 can actuate the motors 132 and 138 individually so that the upper plate 18 and lower plate 20 can be inclined relative to one another so that the extent of metal deformation will either increase or decrease as the plow shoe 82 travels leftwardly between the upper plate 18 and the lower plate 20.

Referring to FIG. 3, a second embodiment of the invention is shown and reference numerals are applied only with respect to the differences that exist between the embodiment of FIG. 1 and the embodiment of FIG. 3. In particular, in the embodiment of FIG. 3, a single motor 160 is utilized and the motor 160 drives a gearbox 162. Gearbox 162 drives a drive cable 164 and a drive cable 166 in unison. Drive cable 164 is attached to a drive socket 168 and the drive cable 166 is connected to a drive socket 170. Accordingly, in the embodiment of FIG. 3, a single motor 160 is employed to operate both ends of the load limiting device.

Thus, it is seen that the invention provides a load limiting device by which the restraint load imposed upon a seated occupant is adapted and tailored to the particular needs of the seated occupant, depending on the operating variables such as vehicle speed, occupant weight, etc. It will be understood that the size and shape of the plates, and the thickness and material of the plates, can be designed to provide desirable rates of energy absorbing metal deformation, which is then further adjusted by adjusting the relative positions of the plates.

What is claimed is:

1. A load limiting device for mounting a seat belt buckle on a vehicle comprising:
   a plow shoe attached to one of the buckle and the vehicle;
   a pair of opposed plates attached to the other of the buckle and the vehicle; said plates having the plow shoe captured therebetween so that upon imposition of an occupant restraint load on the buckle, the plow shoe travels therebetween the plates and absorbs energy by deforming at least one of the plates;
   and an adjusting mechanism adjusting the distance between the opposed plates to selectively increase or decrease the energy absorbing capacity of the load limiting device by determining the extent of metal deformation occurring upon the travel of the plow shoe.

2. The load limiting device of claim 1 further comprising a plurality of sensors for sensing conditions, a controller, and an electric actuator cooperating to operate the adjuster mechanism.

3. The load limiting device of claim 1 further comprising at least one screw mechanism acting between the pair of opposed plates and operated by an electric actuator to selectively increase or decrease the distance between the opposed plates.

4. The load limiting device of claim 1 further comprising the opposed plates each having a first end and a second end, and said adjusting mechanism including a first adjusting mechanism at the first ends of the opposed plates and a second adjusting mechanism at the second ends of the opposed plates.

5. The load limiting device of claim 1 further comprising the opposed plates each having a first end and a second end, and said adjusting mechanism including a first adjusting mechanism at the first ends of the opposed plates and a second adjusting mechanism at the second ends of the opposed plates, said first and second adjusting mechanisms being individually operable so that the ends of the opposed plates can be individually adjusted to thereby incline the plates relative one another.

6. The load limiting device of claim 5 further comprising a single electric actuator operating the first and second adjusting mechanisms in unison.

7. The load limiting device of claim 1 further comprising first and second electric actuators respectively associated with the first and second adjusting mechanisms to individually operate the first and second adjusting mechanisms.

8. The load limiting device of claim 1 further comprising at least one of the opposed plates having a groove therein in which the plow shoe is captured to guide the path of travel of the plow shoe between the plates during the energy absorbing metal deformation.

9. The load limiting device of claim 1 further comprising the plow shoe being a round ball.

10. The load limiting device of claim 1 further comprising the buckle being attached to the plow shoe and the pair of opposed plates being attached to the vehicle.

11. The load limiting device of claim 1 further comprising: the plow shoe being a round ball that is connected to the buckle and the pair of opposed plates being attached to the vehicle.

12. A load limiting device for mounting a seat belt buckle on a vehicle comprising:
   a plow shoe attached to one of the buckle and the vehicle;
   a pair of opposed plates attached to the other of the buckle and the vehicle, said plates each having a first end a second end, and said plow shoe being captured between the plates so that upon imposition of an occupant restraint load on the buckle the plow shoe travels between the plates and absorbs energy by deforming at least one of the plates;
   and a motor operated adjuster mechanism adjusting the distance between the opposed plates at the first end and the second end to selectively increase or decrease the energy absorbing capacity of the load limiting device by determining the extent of metal deformation occurring upon the travel of the plow shoe;

a plurality of sensors sensing conditions from which can be determined the need for adjusting the distance between the opposed plates;

and a controller for controlling the motor operated adjuster mechanism to adjust the distance between the opposed plates in response to the sensed conditions.

13. The load limiting device of claim 12 further comprising said motor operated adjuster mechanism including a first screw acting between the opposed plates at the first end thereof and a second screw acting between the plates at the second end thereof.

14. The load limiting device of claim 12 further comprising a said motor operated mechanism having a separate motor operating each of the screw mechanisms so that the first and second ends of the opposed plates can be adjusted separately.

15. The load limiting device of claim 12 further comprising said motor operated mechanism having a single motor connected to both screw mechanisms so that the first and second ends of the opposed plates can be adjusted in unison.

16. The load limiting device of claim 12 further comprising at least one of the opposed plates having a groove therein in which the plow shoe is captured to guide the path of travel of the plow shoe between the plates during the energy absorbing metal deformation.

17. The load limiting device of claim 12 further comprising the plow shoe being a round ball.

18. The load limiting device of claim 12 further comprising the buckle being attached to the plow shoe and the pair of opposed plates being attached to the vehicle.

19. The load limiting device of claim 12 further comprising: the plow shoe being a round ball that is connected to the buckle and the pair of opposed plates being attached to the vehicle.

20. A load limiting device for mounting a seat belt buckle on a vehicle comprising:

a plow shoe attached to the buckle;

a pair of opposed plates attached to the vehicle, said plates each having a first end a second end and at least one of the plates having a groove therein capturing the plow shoe between the plates so that upon imposition of an occupant restraint load on the buckle the plow shoe travels along the groove between the plates and absorbs energy by deforming at least one of the plates;

a motor operated adjuster mechanism adjusting the distance between the opposed plates at the first end and the second end including motor operated screw mechanisms provided between the opposed plates at opposite ends thereof to selectively increase or decrease the energy absorbing capacity of the load limiting device by changing the distance between the opposed plates and thereby determining the extent of metal deformation occurring upon the travel of the plow shoe;

and a plurality of sensors sensing at least one condition such as for example vehicle speed, occupant weight, occupant position and seat position from which can be determined the need for adjusting the distance between the opposed plates;

and a controller for controlling the motor operated adjuster mechanism to adjust the distance between the opposed plates in response to the sensed conditions.

* * * * *